United States Patent [19]

Strubeck

[11] 4,412,301

[45] Oct. 25, 1983

[54] DIGITAL DATA CORRELATOR
[75] Inventor: W. Douglas Strubeck, Norwood, Mass.
[73] Assignee: GTE Products Corporation, Stamford, Conn.
[21] Appl. No.: 271,737
[22] Filed: Jun. 8, 1981
[51] Int. Cl.³ .......................... G06F 15/34; G06J 1/00
[52] U.S. Cl. .................................. 364/728; 364/604; 364/824; 371/57; 371/21; 371/25
[58] Field of Search ..................... 340/146.2; 364/604, 364/824

[56] References Cited

U.S. PATENT DOCUMENTS 3,292,110 12/1966 Becker .................................. 333/18
3,796,868 3/1974 Kaul .................................... 364/728
3,818,348 6/1974 Puente ............................. 364/728 X

OTHER PUBLICATIONS

Heuner, R. et al., "COS/MOS MSI Counter and Register Design and Applications," Reprinted in RCA Solid State Databook Series, COS/MOS Digital Integrated Circuits, RCA Corp., 1972, pp. 181-183.
"CD4069M/CD4069C Inverter Circuits," CMOS Databook, National Semiconductor 1977, Cat. No. 62-1375, pp. 2-156-2-159.

Primary Examiner—Felix D. Gruber
Assistant Examiner—Ronni S. Malamud
Attorney, Agent, or Firm—Peter Xiarhos; Fred Fisher

[57] ABSTRACT

A digital data correlator is provided which detects the presence of a particular sequence, or correlating pattern, of binary data bits in a serial binary data stream, is tolerant of data errors, and is adjustable to accept different numbers of data errors. The correlator includes a shift register of the CMOS type, a plurality of inverters of the CMOS type connected to selected outputs of the register at which bits of a particular logic value are expected for a properly positioned correlating pattern in the register, and a plurality of like-valued resistances coupled to the outputs of the register and to the inverters. Erroneous bits in the register cause an error voltage to be produced at a common node point coupled to the resistances. The value of the error voltage is compared in a comparator against a threshold reference voltage of a value related to an acceptable number of erroneous bits. An output of a first logic value is produced by the comparator when the number of erroneous bits in the register exceeds the acceptable number, and an output of a second logic value is produced by the comparator when the number of erroneous bits in the register is equal to or less than the acceptable number.

The digital data correlator further includes circuitry capable of altering the number of erroneous bits that will be tolerated or accepted by the correlator.

7 Claims, 2 Drawing Figures

DIGITAL DATA CORRELATOR

BACKGROUND OF THE INVENTION

The present invention relates to a correlator and, more particularly, to a digital data correlator which detects the presence of a particular sequence of binary data bits in a serial binary data stream, is tolerant of data errors, and is adjustable to accept different numbers of data errors.

In the design of digital data communications equipment it is frequently necessary to detect the presence of a particular sequence of data bits in a received binary data stream. In particular, a sequence of data bits might be arranged as a code word, typically eight to thirty-two bits long, and be used as a marker in a serial data stream to delineate the start and end of data blocks or be inserted periodically in a data stream to mark the start of a frame of data. In order to process the data properly, it is generally necessary to detect the code word and adjust circuitry (e.g., digital counting circuits) to count in synchronism with the periodic code word. If the digital data stream is generated by distant communications equipment and is transmitted to the receiver without errors, the design of the logic circuitry needed to search the data for a perfect match to the transmitted code word is relatively straightforward and simple. However, practical data transmission systems always insert a small number of randomly distributed errors into the transmitted data stream.

If it is desired to detect a particular code word, given that some of the bits of the word are in error, the design problem becomes more difficult. For example, if the code word length is eight bits, and either one or two bit errors are to be allowed, there are thirty-six unique code patterns which are acceptable in addition to the perfect match. One possible solution to the above problem is to employ a comparison and error counting scheme implemented, by way of example, by a shift register having N stages or positions, where N represents the length of the code word desired to be detected in the incoming serial data stream. In this particular arrangement, the incoming serial data is shifted through the register and after each shift operation a series of counters and multiplexers are used to examine each of the N bit positions, one at a time, and count the number of bits in error. After all of the bit positions are tested, the error count is compared against a threshold count to determine whether the proper pattern is in the shift register. The above arrangement, while offering a workable solution, is expensive, requiring many counters and multiplexers, and is difficult to design due to the timing needed for controlling the logic. The greatest limitation, however, is speed. A clock of at least N times the input data rate is necessary to accomplish examination of the N bit positions before the next shift of data through the register. To emphasize this point, for a data rate of 512 kilobits/second and a data code word 18 bits long, the clock rate must be at least 9.216 MHz. Operations at these speeds require higher power logic than that needed to process data at 512 kilobits/second. Also, consideration must be given to the availability of such a high speed clock in any data receiving system.

Another solution to the above-described problem is to use outputs of a shift register as address lines to a memory (e.g., ROM, PROM, EPROM, etc.). In this arrangement, each combination of bits in the shift register selects a different location in the memory. The memory contains a logic "1" if the data pattern (address to memory) is acceptable or a logic "0" if the pattern is not acceptable. The above arrangement works well at high data rates, requiring no higher frequency clocks, but is expensive for moderate to large values of N (number of bits of the code word). By way of example, for N=18, a large and expensive memory of 262,144 ($2^N$) locations is needed.

BRIEF SUMMARY OF THE INVENTION

In accordance with the present invention, a digital data correlator is provided which avoids the particular shortcomings of data correlators as briefly described hereinabove. The digital data correlator in accordance with the invention, as in the same case of the data correlators described hereinabove, is utilized to detect the presence of a predetermined binary code word in a data stream, which code word comprises a predetermined combination of bits of first and second possible logic values.

The digital data correlator of the invention generally comprises a stroage means, a linear circuit means and a comparator means. The storage means is arranged to receive and store therein bits of a data stream and has a plurality of outputs at which the bits stored in the storage means are presented. Each of these outputs is at the same value of impedance irrespective of the logic value of the bit presented to the output.

The linear circuit means is coupled to the outputs of the storage means and operates whenever bits presented to the outputs of the storage means have values other than those expected when a coded word having the predetermined combination of bits is present at the outputs of the storage means to produce an analog error voltage having a value linearly related to the number of erroneous bits. The error voltage is independent of the position of the erroneous bits in the storage means.

The comparator means is coupled to the linear circuit means and operates to compare the value of each error voltage produced by the linear circuit means against a reference voltage having a value related to a predetermined number of erroneous bits. The comparator means produces an output of a first value indicative of an accepted code word when the compared voltages bear a predetermined first relationship to each other and an output of a second value indicative of a non-accepted code word when the compared voltages bear a predetermined second relationship to each other.

The digital data correlator of the invention further contemplates the possibility of altering the number of erroneous bits that will be tolerated. In this situation, a control circuit means is coupled to the above-described comparator means and operates to control the value of the voltage produced by the linear circuit means and applied to the comparator means thereby to alter the number of erroneous bits that will be tolerated in the storage means before the comparator means produces its output of the second value indicative of a non-accepted code word.

BRIEF DESCRIPTION OF THE DRAWING

Various objects, features and advantages of a digital data correlator in accordance with the present invention will be apparent from a detailed discussion taken in conjunction with the accompanying drawing in which.

DETAILED DESCRIPTION OF THE INVENTION

Figure 1:
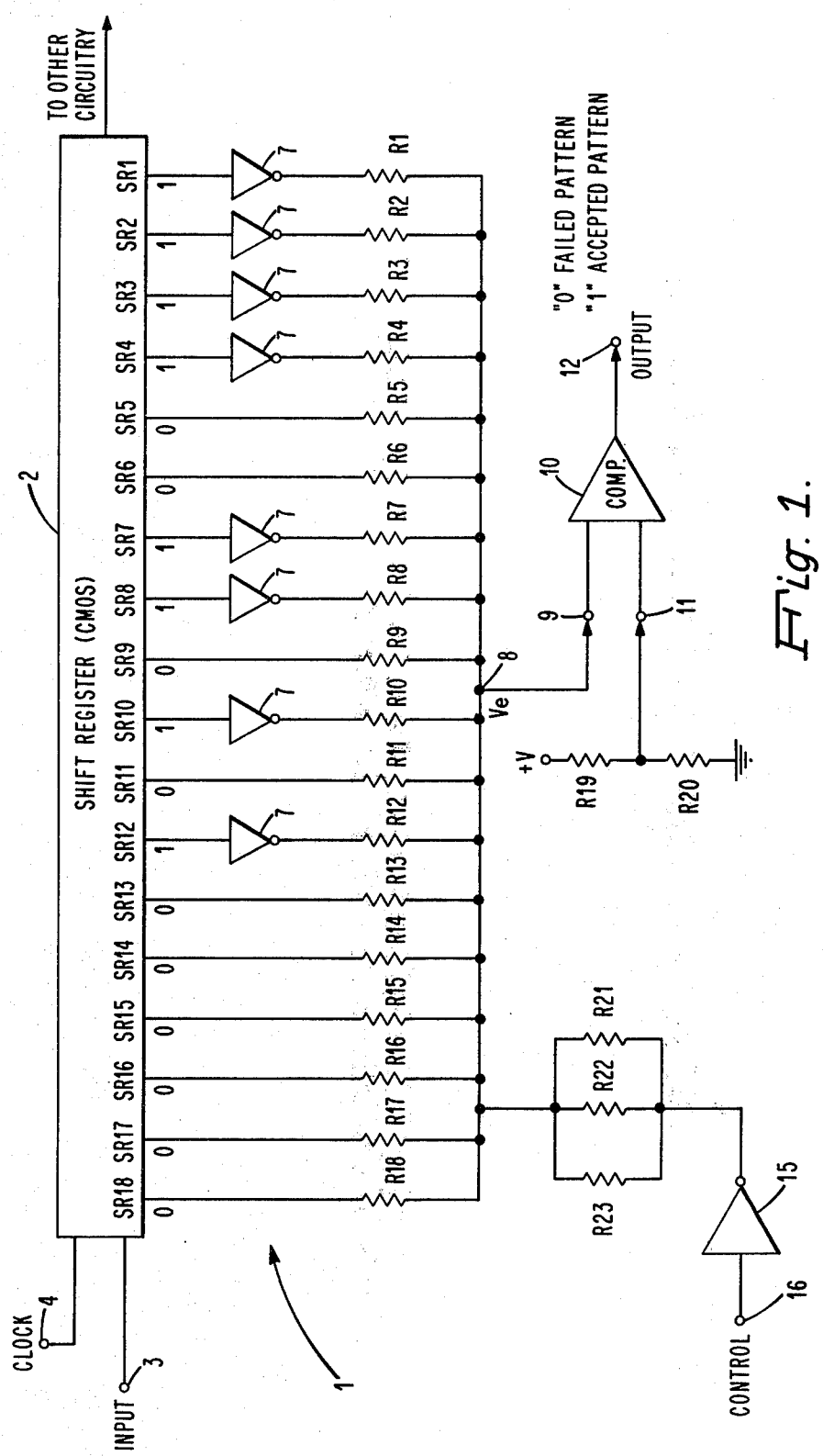
FIG. 1 is a schematic block diagram of a digital data correlator in accordance with the present invention.

Referring now to FIG. 1, there is shown a digital data correlator 1 in accordance with the present invention. The digital data correlator 1 as shown in FIG. 1 includes a multi-stage shift register 2 having an input terminal 3 to which a binary data stream is applied to be correlated with a predetermined binary pattern, a clock input 4 to which clock pulses (e.g., 1MHz) are applied for clocking the binary date stream into and along the register 2 at the input bit rate, and a plurality of outputs SR1-SR18. The shift register 2 is selected to be of a CMOS (complementary metal oxide silicon) type, whereby each of the outputs SR1-SR18 has the same impedance irrespective of whether the bit at the output has a logic "1" value or a logic "0" value. The shift register 2 may be suitably implemented by a series arrangement of shift register circuits such as the type 4015B sold by Fairchild Semiconductor and others.

Serial binary data clocked into and along the shift register 2 is continuously examined, specifically, during each bit time, to determine the presence in the register 2 of a particular code word represented by a particular pattern of bits. A typical example of such a pattern of bits, termed a "correlating pattern", is shown in FIG. 1 and includes 18 bits in the particular combination 000000101011001111. Each of the bit positions of the correlating pattern corresponds to a different one of the outputs SR1-SR18 of the shift register 2. Each successive series or combination of 18 bits shifted into and along the shift register 2 is examined at the outputs SR1-SR18 to determine the presence in the register 2 of the code word having the above precise combination of "0's" and "1's". Each bit appearing at one of the outputs SR1-SR18, whether correct or incorrect, is either applied directly to one of a bank of like-valued resistors R1-R18 or first inverted by one of a plurality of inverters 7 and then applied to one of the resistors R1-R18. The inverters 7, which are also of the CMOS type, are coupled to the outputs of the register 2 where logic "1's" are expected to be present in the register 2 for a properly positioned code word in the register 2 and serve to invert the logic "1's" to logic "0's". Thus, for a properly positioned code word in the register 2 having the precise combination of bit values 000000101011001111, the inputs and, thus, the outputs, of the resistors R1-R18 are at logic "0" values.

Figure 2:
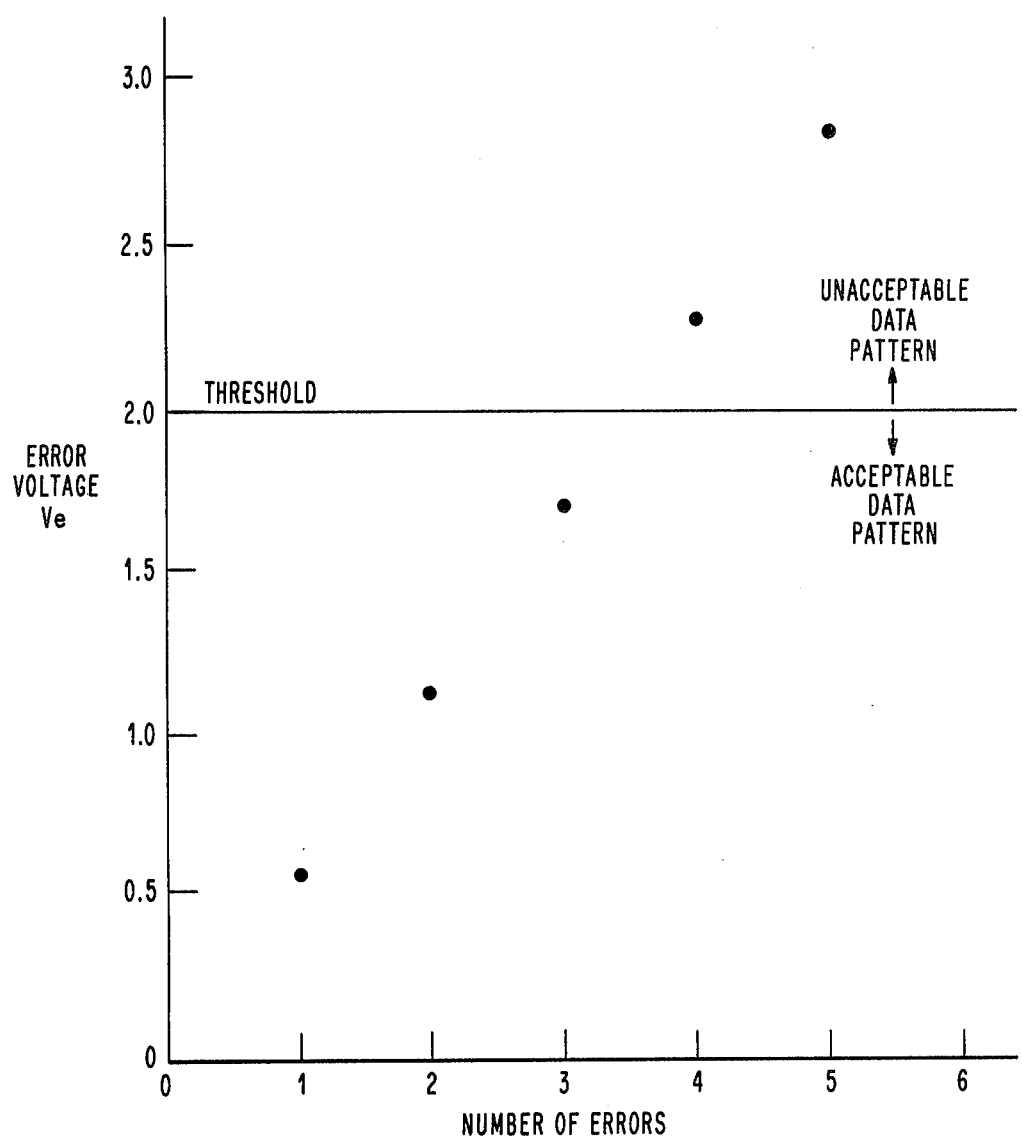
FIG. 2 is a graphic representation of error voltage versus number of bit errors corresponding to the digital data correlator of FIG. 1.

The outputs of the registors R1-R18 are coupled in common to a node point 8 which, for a correct, properly positioned code word in the register 2, is at approximately zero volts, or ground potential. For each bit in the register 2 which is in error, as represented by a logic "1"at the output of the associated resistor, a small voltage, for example, about 0.5 volt, is established at the node point 8. The cumulative voltage established at the node point 8, representing, an error voltage and designated $V_e$ in FIG. 1, is coupled to a first input 9 of a comparator circuit 10 and compared against a threshold reference voltage established at a second input 11 of the comparator circuit 10. The threshold voltage at the input 11 is selected, specifically, by a pair of resistors R19 and R20 connected between a positive voltage source $+V$ (e.g., 12 volts) and ground potential, to have a value related to the number of errors that will be tolerated. For example, if zero errors will be tolerated, the voltage at the input 11 of the comparator circuit 10 is established to have a value, for example, about 0.25 volt, below that which will be established at the node point 8 by a single erroneous bit (e.g., 0.5 volt). An output 12 of the comparator circuit 10 will, in the case of the above zero error situation, be at a logic "0" value indicating the failed pattern for any pattern with one or more errors. If a larger number of errors will be tolerated, for example, three errors, the threshold voltage at the input 11 of the comparator circuit 10 is established at a value below that which would be established at the node point 8 by four erroneous bits, for example, about 2 volts. The output 12 of the comparator circuit 10 will, in this case, again be at a logic "0" value indicating a failed pattern for any pattern with four or more errors. A logic "1" output of the comparator circuit 10 would indicate an accepted pattern. FIG. 2 clearly indicates the linear nature of errors versus error voltage. This result is entirely due to the fact that each of the outputs SR1-SR18 of the register 2 has the same value of impendance whether a logic "1" or logic "0" is at that output (due to the CMOS nature of the register 2) and also because the inverters 7 are of the CMOS type and all of the resistors R1-R18 are of the same resistance value. The voltage $V_e$ established at the node point 8 is thus dependent entirely on the number of bits in error, irrespective of the particular positions of the erroneous bits in the register 2, and not on the particular numerical value of the total pattern of bits in the register 2. Thus, there is no need to weight the values of the resistors R1-R18 in accordance with a "powers of two" scheme. Typical values for the resistors R1-R18 are 47 kilohms, and typical values for the resistors R19 and R20 are 7.5 kilohms and 1.5 kilohms, respectively.

The digital data correlator 1 as described hereinabove further has the capabiltity of being alterable to vary the number of errors which will be accepted or tolerated. By way of example, it may be desired that the correlator 1 tolerate either zero erroneous bits or no more than three erroneous bits. The alterability of the permissible number of errors is established in the above example by means of three additional parallel-connected resistors R21-R23 coupled in series with the node point 8 and an additional inverter 15, also of the CMOS type, which is coupled, in turn, to a control input 16. The resistors R21-R23 are of the same values as the resistors R1-R18. The control input 16 to the inverter 15 is arranged to be placed at a logic "0" value if zero erroneous bits are to be tolerated and at a logic "1" value if three or fewer erroneous bits are to be tolerated. For the zero error situation, the output of the inverter 15 is at a logic "1" value (by inverting the logic "0" at its input), and the three additional resistors R21-R23 cause respective voltages, equivalent in total to the analog of three erroneous bits, to be established at the node point 8 and pre-bias the node point 8 and, thus, the input 9 of the comparator circuit 10, to that three-error analog voltage. A single erroneous bit in the register 2 has the effect of pushing the voltage $V_e$ at the node point 8 above the threshold voltage of the comparator circuit 10. The output 12 of the comparator circuit 10 in this case will be a logic "0" indicating a failed pattern. This specific situation is depicted in FIG. 2.

In similar fashion, for the three or fewer error situation, the output of the inverter 15 is at a logic "0" value (by inverting the logic "1" at its input), and the three additional resistors R21–R23 no longer pre-bias the node point 8 such that up to three erroneous bits can occur in the register 2 without the value of the voltage $V_e$ at the node point 8 being greater than the value of the threshold reference voltage of the comparator circuit 10. The result in the three or less error situation is that the output 12 of the comparator circuit 10 is at a logic "1" value indicating an accepted (correlating) pattern.

The digital data correlator 1 as described hereinabove is subject to many possible design variations. By way of example, the linear nature of the correlator 1 enables the length of the register 2 to be expanded or contracted to accommodate any desired total number of bits, and to be employed in the correlation of any one of several different possible codes (with appropriate positioning of the inverters at the outputs of the register). It is also possible, by employing exclusive-or gates at the outputs of the shift register to perform inversion operations, to dynamically establish several code words for correlating purposes. In addition, it is possible, by the use of multiple control circuits, such as the aforedescribed combination of the resistors R21–R23 and the inverter 15, to achieve a variety of different amounts of pre-biasing (threshold variations) of the comparator circuit 10 and, thus, the number of tolerable erroneous bits. Other changes and modifications will be apparent to those skilled in the art without departing from the invention as called for in the appended claims.

What is claimed is:

1. A digital data correlator for detecting the presence of a predetermined binary code word in a data stream, said code word comprising a predetermined combination of bits of first and second possible logic values, said digital data correlator comprising:

storage means arranged to receive and store therein bits of a data stream and having a plurality of outputs at which the bits stored in the storage means are presented, each of said outputs being at the same value of impedance irrespective of the logic value of the bit presented to the output;

linear circuit means coupled to the outputs of the storage means and operative whenever bits presented to the outputs of the storage means have values other than those expected when a coded word having the predetermined combination of bits is present at the outputs of the storage means to produce an analog error voltage having a value linearly related to the number of erroneous bits, said error voltage being independent of the position of the erroneous bits in the storage means;

wherein the linear circuit means comprises:

a plurality of inverter means coupled to selected ones of the outputs of the storage means and corresponding to bits of one of the two possible logic values expected to be present at the selected outputs when a code word having the predetermined combination of bits is present in the storage means and at the outputs of the storage means, each of said inverter means being operative to invert the logic value of the bit presented to the corresponding output of the storage means; and a plurality of like-valued resistance means coupled to the plurality of inverter means, to the outputs of the storage means and to a common point coupled to the comparator means, said plurality of like-valued resistance means being operative in conjunction with the inverter means to establish and provide to the common point to the comparator means an analog error voltage whenever bits presented to the outputs of the storage means have values other than those expected when a code word having the predetermined combination of bits is present in the storage means at the outputs of the storage means; and comparator means coupled to the linear circuit means and operative to compare the value of each error voltage produced by the linear circuit means against a reference voltage having a value related to a predetermined number of erroneous bits and to produce an output of a first value indicative of an accepted code word when the compared voltages bear a predetermined first relationship to each other and to produce an output of a second value indicative of a non-accepted code word when the compared voltages bear a predetermined second relationship to each other.

2. A digital data correlator in accordance with claim 1 wherein:

the storage means includes a shift register of the complementary metal oxide silicon (CMOS) type; and the inverter means include inverters of the complementary metal oxide silicon type.

3. A digital data correlator for detecting the presence of a predetermined binary code word in a data stream, said code word comprising a predetermined combination of bits of first and second possible logic values, said digital data correlator comprising:

storage means arranged to receive and store therein bits of data stream and having a plurality of outputs at which the bits stored in the storage means are presented, each of said outputs being at the same value of impedance irrespective of the logic value of the bit presented to the output;

linear circuit means coupled to the outputs of the storage means and operative whenever bits presented to the outputs of the storage means have values other than those expected when a coded word having the predetermined combination of bits is present at the outputs of the storage means to produce an analog error voltage having a value linearly related to the number of erroneous bits, said error voltage being independent of the position of the erroneous bits in the storage means;

comparator means coupled to the linear circuit means and operative to compare the value of each error voltage produced by the linear circuit means against a reference voltage having a value related to a predetermined number of erroneous bits and to produce an output of a first value indicative of an accepted code word when the compared voltages bear a predetermined first relationship to each other and to produce an output of a second value indicative of a non-accepted code word when the compared voltages bear a predetermined second relationship to each other; and control circuit means coupled to the comparator means for controlling the value of the voltage produced by the linear circuit means and applied to the comparator means thereby to alter the number of erroneous bits that will be tolerated in the storage means before the comparator means produces its output of the second value indicative of a non-accepted code word.

4. A digital data correlator in accordance with claim 3 wherein the linear circuit means comprises:

a plurality of inverter means coupled to selected ones of the outputs of the storage means and corresponding to bits of one of the two possible logic values expected to be present at the selected outputs when a code word having the predetermined combination of bits is present in the storage means and at the outputs of the storage means, each of said inverter means being operative to invert the logic value of the bit presented to the corresponding output of the storage means; and a plurality of like-valued resistance means coupled to the plurality of inverter means, to the outputs of the storage means and to a common point coupled to the comparator means, said plurality of like-valued resistance means being operative in conjunction with the inverter means to establish and provide to the common point to the comparator means an analog error voltage whenever bits presented to the outputs of the storage means have values other than those expected when a code word having the predetermined combination of bits is present in the storage means at the outputs of the storage means.

5. A digital data correlator in accordance with claim 4 wherein:

the storage means includes a shift register of the complementary metal oxide silicon (CMOS) type; and the inverter means include inverters of the complementary metal oxide silicon type.

6. A digital data correlator in accordance with claim 5 wherein the control circuit means comprises:

a selected number of additional resistance means coupled to the common point and to the comparator means, said additional resistance means being of the same value as the other resistance means; and an additional inverter means coupled to the selected number of additional resistance means and arranged to receive and invert a control bit of a first or second logic value;

said additional inverter means and said additional resistance means being operative when the control bit received by said additional inverter means is of the first logic value to alter the value of the error voltage applied to the common point and to the comparator means thereby to establish a first number of erroneous bits that will be tolerated in the shift register of the storage means before the comparator means produces its output of the second value indicative of a non-accepted code word, and said additional inverter means and said additional resistance means being operative when the control bit received by said additional inverter means is of the second logic value to alter the value of the error voltage applied to the common point and to the comparator means thereby to establish a second number of erroneous bits that will be tolerated in the shift register of the storage means before the comparator means produces its output of the second value indicative of a non-accepted code word.

7. A digital data correlator in accordance with claim 6 wherein:

the additional inverter means include an inverter of the complementary metal oxide silicon type.

* * * * *